United States Patent [19]

McCarty et al.

[11] Patent Number: 5,168,699
[45] Date of Patent: Dec. 8, 1992

[54] APPARATUS FOR IGNITION DIAGNOSIS IN A COMBUSTION TURBINE

[75] Inventors: William L. McCarty, Orlando; Kermit R. Wescott; Paul J. Tyler, both of Winter Springs, all of Fla.; Leo P. St. Onge, Wexford, Pa.

[73] Assignee: Westinghouse Electric Corp., Pittsburgh, Pa.

[21] Appl. No.: 661,744

[22] Filed: Feb. 27, 1991

[51] Int. Cl.$^5$ .............................. F02C 7/264
[52] U.S. Cl. ........................ 60/39.091; 60/39.141
[58] Field of Search ............ 60/39.06, 39.091, 39.141, 60/39.821, 39.827, 223

[56] References Cited

U.S. PATENT DOCUMENTS

| | | | |
|---|---|---|---|
| 2,866,385 | 12/1958 | Miller | 60/39.091 |
| 4,308,463 | 12/1981 | Giras et al. | 290/1 |
| 4,368,617 | 1/1983 | Fukuda | 60/39.141 |
| 5,103,629 | 4/1992 | Mumford et al. | 60/39.141 |

*Primary Examiner*—Louis J. Casaregola

[57] ABSTRACT

Method and apparatus for diagnosing ignition failure conditions in a combustion turbine are shown to generally include referencing members for generating a plurality of reference signals, wherein each of the reference signals are representative of a desired ignition operating condition, sensors for sensing actual ignition operating conditions each of which correspond to a desired ignition operating condition. The sensors generate a plurality of operating signals representative of actual ignition operating conditions. Comparators are utilized for comparing each of the operating signals to a corresponding reference signal and to indicate when the operating signal exceeds the reference signal in the presence of an ignition enabling signal.

17 Claims, 11 Drawing Sheets

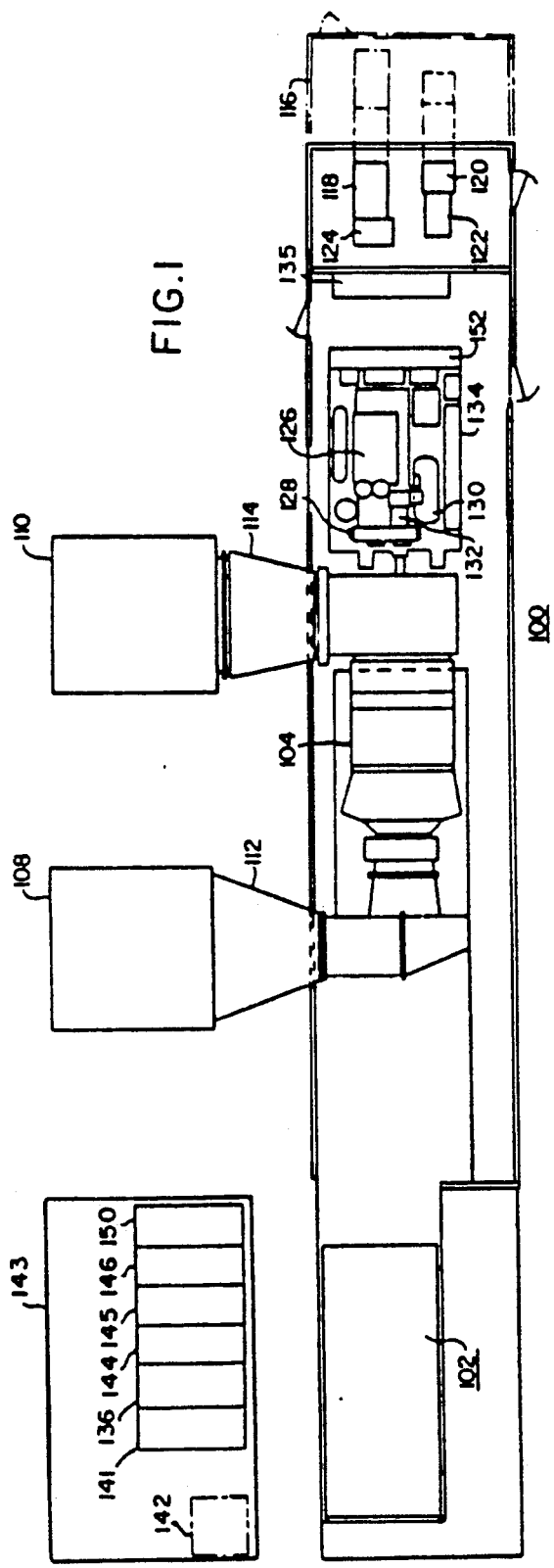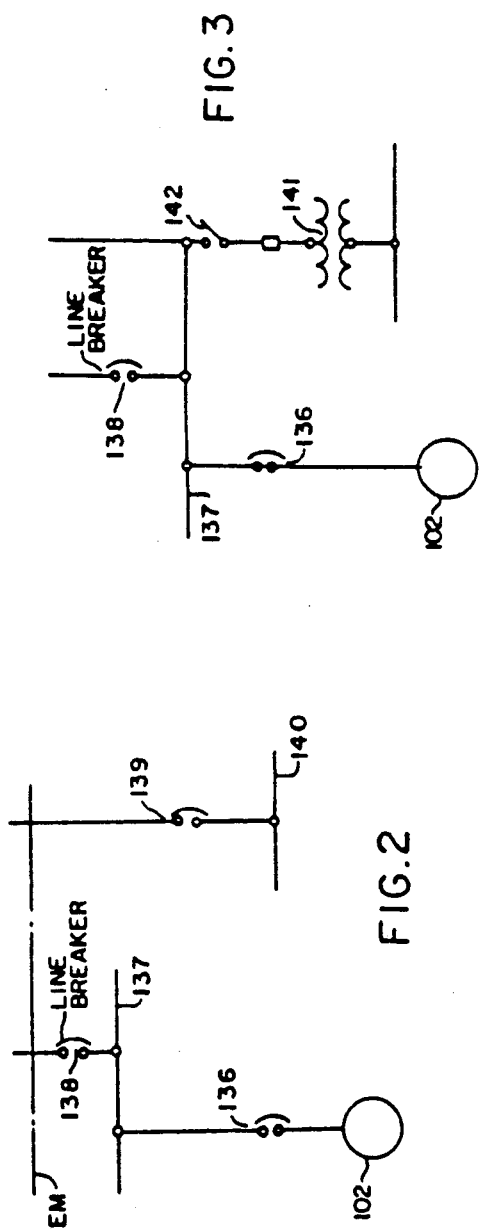

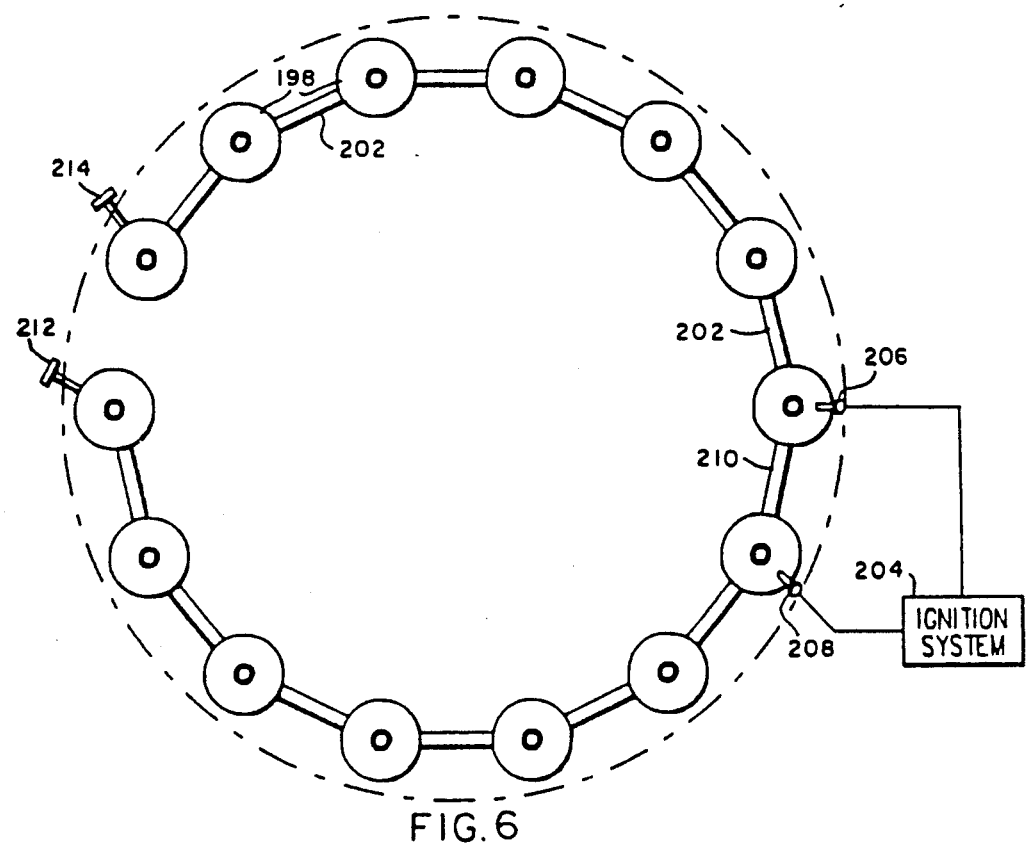
FIG. 6
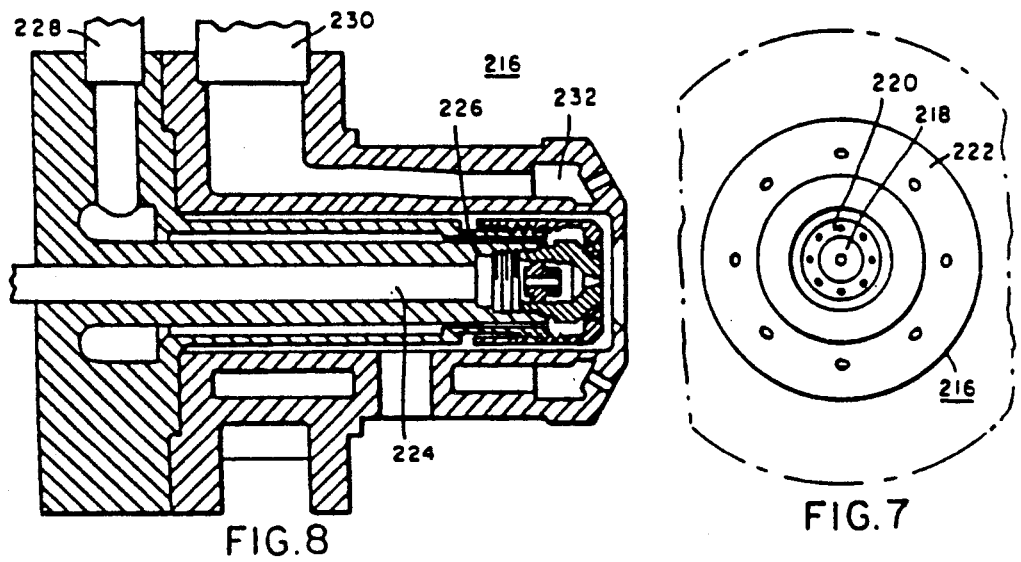
FIG. 8
FIG. 7

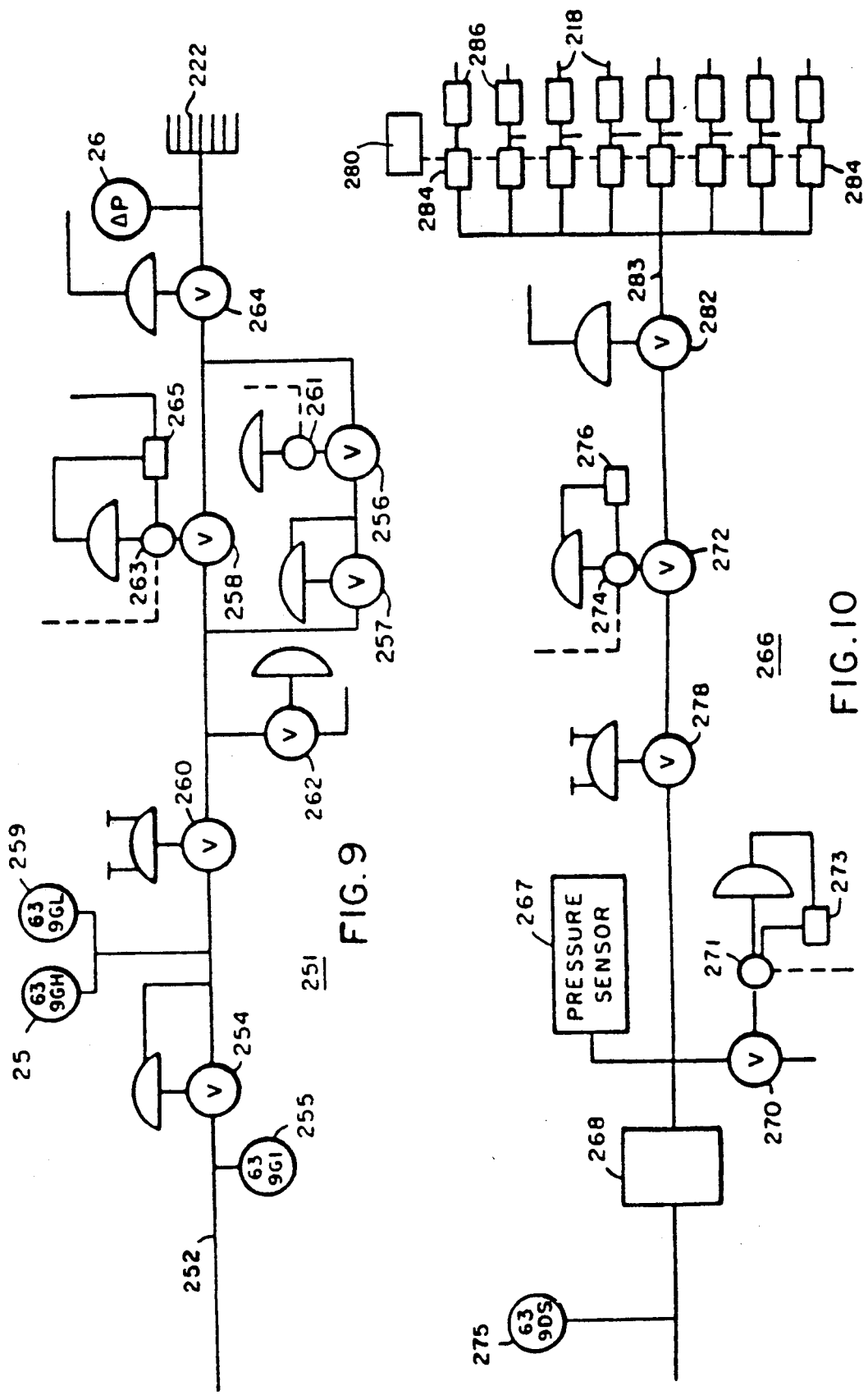

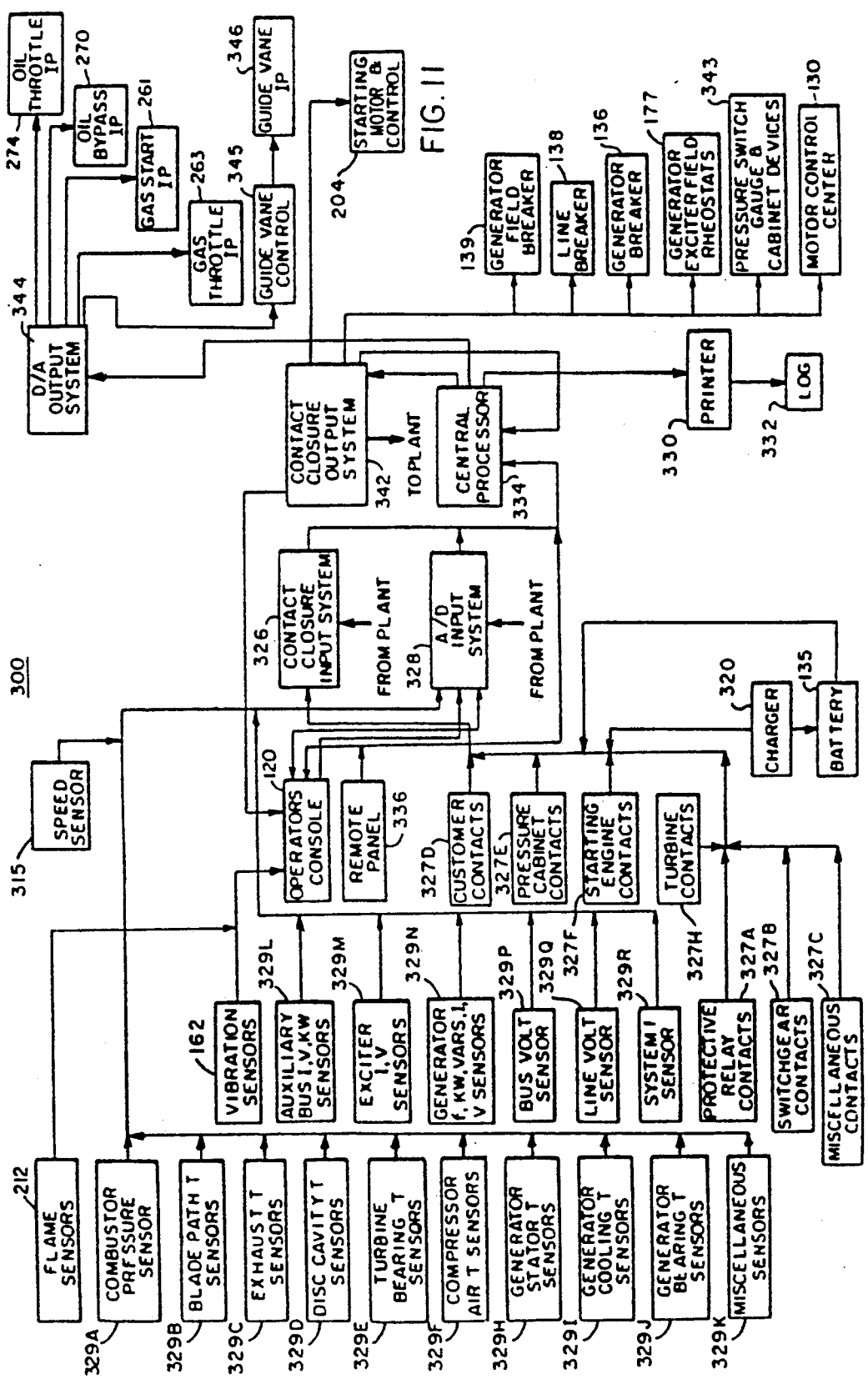

APPARATUS FOR IGNITION DIAGNOSIS IN A COMBUSTION TURBINE

FIELD OF THE INVENTION

The present invention relates generally to the field of combustion turbines and more particularly to the field of ignition control and diagnosis systems for combustion turbines. Although the present invention may find particular utility in the field of gas turbine electric power plants, and will be described in relation to such equipment, the invention can also be applied to combustion turbines having other uses.

BACKGROUND OF THE INVENTION

In the operation of gas turbines, particularly in electric power plants, various kinds of control systems have been employed from relay-pneumatic type systems, to analog type electronic controls, to digital controls, and more recently to computer based software controls. U.S. Pat. No. 4,308,463 - Giras et al., assigned to the assignee of the present invention and incorporated herein by reference, lists several of such prior systems. That patent particularly discloses a digital computer based control system for use with gas turbine electric power plants. It will be noted that the Giras et al. patent is one of a family of patents all of which are cross referenced therein.

Subsequent to the Giras et al. patent, other control systems have been introduced by Westinghouse Electric Corporation of Pittsburgh, Pennsylvania under the designations POWERLOGIC and POWERLOGIC II. Similar to the Giras et al. patent these control systems are used to control gas turbine electric power plants. However, such control systems are primarily microprocessor based computer systems, i.e. the control systems are implemented in software, whereas prior control systems were implemented in electrical and electronic hardware.

The operating philosophy behind the POWERLOGIC and POWERLOGIC II control system is that it shall be possible for the operator to bring the turbine generator from a so-called ready-start condition to full power by depressing a single button. All modes of turbine-generator operation are to be controlled. For example, ignition control in prior combustion turbines, such as the W501D5, utilize compressor discharge pressure and other factors as a measure for determining when ignition should occur. Unfortunately, monitoring such factors can still result in a failure for ignition to occur. For example, ambient temperature can effect air flow through a combustion turbine by as much as 6 percent. The possibility exists that certain fuel/air conditions which are outside the ignition envelope of the combustion turbine could occur. If ignition failure occurs there is presently no quick way to determine what went wrong. Consequently, a need exists for more reliably diagnosing ignition failures.

Although, the operation of a gas turbine electric power plant and the POWERLOGIC II control system are described generally herein, it should be noted that the invention is particularly concerned with diagnosing the ignition process in gas turbines.

SUMMARY OF THE INVENTION

It is an object of the present invention to provide an electric power plant having a combustion turbine driven generator which is capable of diagnosing ignition failures.

It is another object of the present invention to provide turbine having diagnostic capabilities wherein ignition operating conditions are monitored and compared to desired operating conditions.

It is still another object of the present invention to generate diagnostic signals which are indicative of turbine ignition conditions not in conformance with desired ignition conditions.

These and other objects of the invention are achieved by method and apparatus for diagnosing ignition failure conditions in a combustion turbine which are shown to generally include referencing members for generating a plurality of reference signals, wherein each of the reference signals are representative of a desired ignition operating condition, sensors for sensing actual ignition operating conditions each of which correspond to a desired ignition operating condition. The sensors generate a plurality of operating signals representative of actual ignition operating conditions. Comparators are utilized for comparing each of the operating signals to a corresponding reference signal and to indicate when the operating signal exceeds the reference signal in the presence of an ignition enabling signal. In particular embodiments of the invention several ignition operating conditions are diagnosed, including, air flow, fuel flow for both gas and oil, atomizing air flow, fuel oil temperature, ignitor operation and combustor basket operation.

BRIEF DESCRIPTION OF THE DRAWINGS

These and other objects and advantages of the invention will become more apparent from the following detailed description when taken in conjunction with the following drawings, in which:

FIG. 1 shows a top plan view of a gas turbine power plant arranged to operate in accordance with the principles of the present invention;

FIGS. 2 and 3 show respective electrical systems useable in the operation of the gas turbine power plant of FIG. 1;

FIGS. 6–8 show a fuel nozzle and parts thereof employed in the gas turbine of FIG. 5;

FIGS. 9 and 10 respectively show schematic diagrams of gas and liquid fuel supply systems employed with the gas turbine of FIG. 5;

FIG. 11 shows a block diagram of a digital computer control system employed to operate the gas turbine power plant of FIG. 1;

DETAILED DESCRIPTION OF THE EMBODIMENTS

Figure 4:
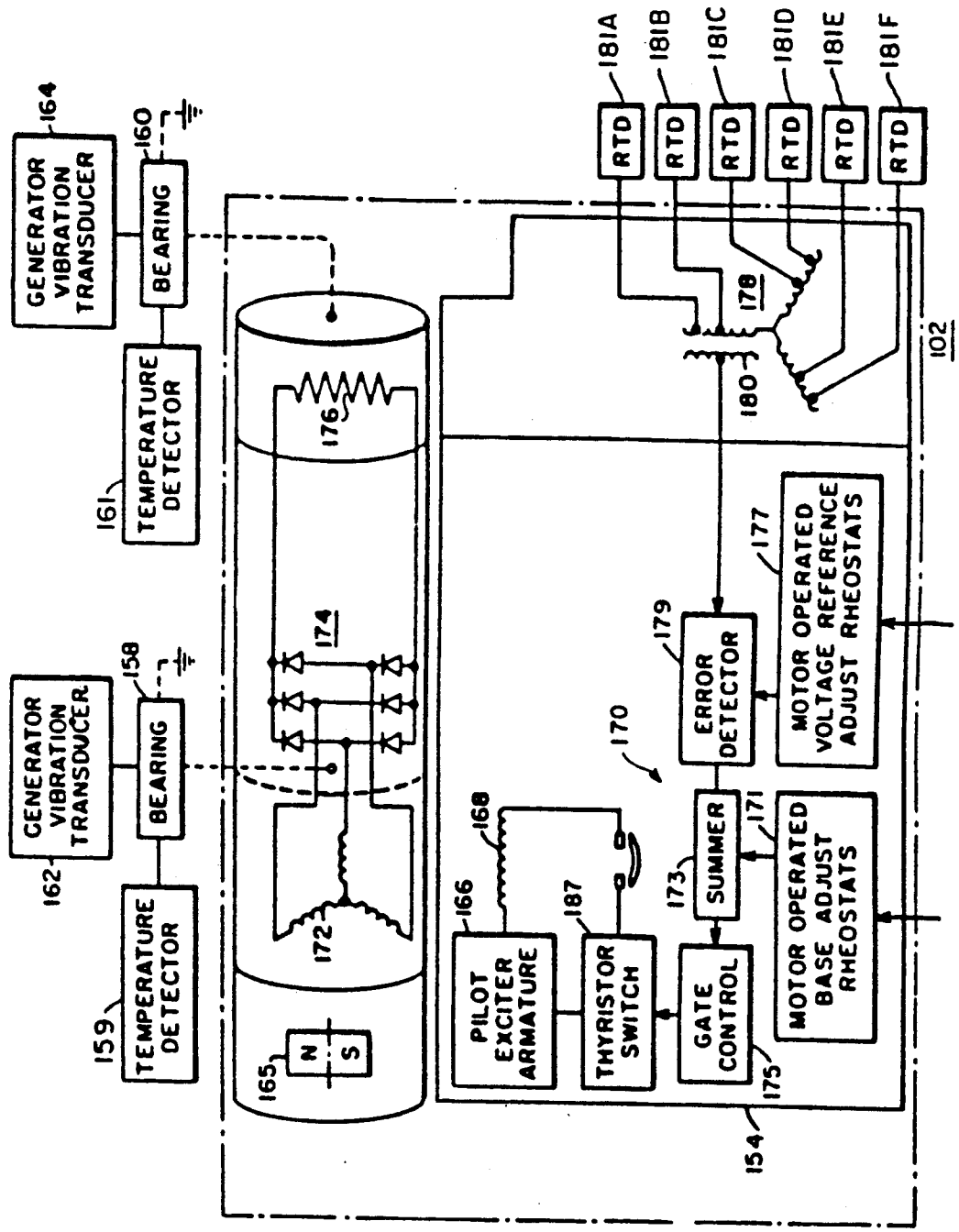
FIG. 4 shows a schematic view of a rotating rectifier exciter and a generator employed in the gas turbine power plant of FIG. 1.

A new and novel method and apparatus for diagnosing ignition failure in a combustion turbine-generator is described in relation to FIGS. 13 through 19 herein. Although the present invention can be implemented in either software or hardware, in the preferred embodiment it is implemented in software contained in a central processing unit to be described herein. However, before describing the particular program of the present invention consider first an overall description of the operating environment for the invention, namely a combustion turbine powered electric power plant.

There is shown in FIG. 1 a gas turbine electric power plant 100 which includes AC generator 102 driven by combustion or gas turbine 104. In the embodiment described herein, gas turbine 104 is preferably the W501D5 type manufactured by Westinghouse Electric Corporation. Community acceptance of power plant 100 is enhanced by the use of inlet and exhaust silencers 108 and 110 which are coupled respectively to inlet and exhaust ductworks 112 and 114.

The foundation for plant 100 is approximately 106 feet long if a control station is provided for a single plant unit. The foundation length can be increased as indicated by the reference character 116 to provide for a master control station. A master control station would be warranted if additional plant units, grouped with plant 100, are to have common control.

Micro-processor based computers and other control system circuitry in cabinet 118 provides for operation and control of power plant 100. In the preferred embodiment, cabinet 118 includes Westinghouse Distributed Processing Family (WDPF) equipment sold by Westinghouse Electric Corporation and can include two distributed processing units, an engineers console and a logger. An operator's cabinet 120, associated with the control cabinet 118, contains a vibration monitor, electronics for UV flame detectors, a synchroscope, and various push-button switches. Printer 122 and a protective relay panel 124 for sensing abnormal electric power system conditions are associated with the control cabinet 118.

Start up or cranking power for the plant 100 is provided by a starting meter 126 which is coupled to the drive shaft of gas turbine 104 through a starting gear unit 128. During the initial start up period, AC motor 128 operates through a turning gear 130 and starting gear 132 to drive the gas turbine. When turbine 104 reaches approximately 20 percent of rated speed, ignition takes place.

A motor control center 134 is provided for operation of the various auxiliary equipment items associated with the plant 100. Various signals from sensor or contact elements associated with motor control center 134 and with other devices mounted on the auxiliary bed plate are transmitted for use in the control system as considered more fully in connection with FIG. 11. A plant battery 135 is disposed adjacent to one end of the auxiliary bed plate or skid.

One possible internal electrical power system for use with plant 100 is shown generally in FIG. 2. Once plant 100 is in operation, power generated by generator 102 is transmitted to the power system through generator breaker 136, through 13.8 KV bus 137 to a main transformer (not shown) and line breaker 138. Auxiliary power for the plant 100 is obtained from the internal power system through an auxiliary breaker 139 and an auxiliary power 480 volt bus 140. The generator breaker 136 serves as a synchronizing and protective disconnect device for the plant 100.

If a suitable 480 volt source is not available in the internal power system, an auxiliary power transformer 141 can be provided as shown in FIG. 3. A disconnect switch 142 is connected between transformer 141 and the station 13.8 KV bus 137. The arrangement as shown in FIG. 3 can provide for so-called black plant start up operation.

As shown in FIG. 1, switch gear pad 143 is included for 15 KV switch gear 144, 145 and 146, including generator breaker 136. The auxiliary power transformer 141 and disconnect switch 142 are also disposed on switch gear pad 143 if they are selected for use by the user. Excitation switch gear 150 associated with the generator excitation system is also included on the switch gear pad 143. As will be described in greater detail hereinafter, the I/O circuitry of cabinet 118 accepts signals from certain sensor or contact elements associated with various switch gear pad devices.

A pressure switch and gauge cabinet 152 is also included on the auxiliary bed plate. Cabinet 152 contains the pressure switches, gauges, regulators and other miscellaneous elements needed for gas turbine operation.

Generator 102, including brushless exciter 154, is schematically illustrated in greater detail in FIG. 4. The rotating elements of generator 102 and exciter 154 are supported by a pair of bearings 158 and 160. Conventional generator vibration transducers 162 and 164 are coupled to bearings 158 and 160 for the purpose of generating input data for the plant control system. Resistance temperature detectors (RTD) 181 A-F, embedded in the stator winding, are installed to measure the winding temperatures. Temperature detectors 159 and 161 measures bearing oil drain temperatures as indicated in FIG. 4. Signals from the temperature sensors and vibration transducers 162 and 164 are transmitted to the control system, i.e. cabinet 118.

In the operation of the exciter 154, a permanent magnet field member 165 is rotated to induce voltage in a pilot exciter armature 166 which is coupled to a stationary AC exciter field 168 through a voltage regulator (not shown). Voltage is thereby induced in an AC exciter armature 172 formed on the exciter rotating element and it is applied across diodes mounted with fuses on a diode wheel 174 to energize a rotating field element 176 of the generator 102. Generator voltage is induced in a stationary armature winding 178 which supplies current to the power system through a generator breaker 136 when the plant 100 is synchronized and on the line. A transformer 180 supplies a feedback signal for the regulator 170 to control the excitation level of the exciter field 168. The signal from transformer 180 is also used as the generator megawatt signal, a control signal supplied to cabinet 118.

Figure 5:
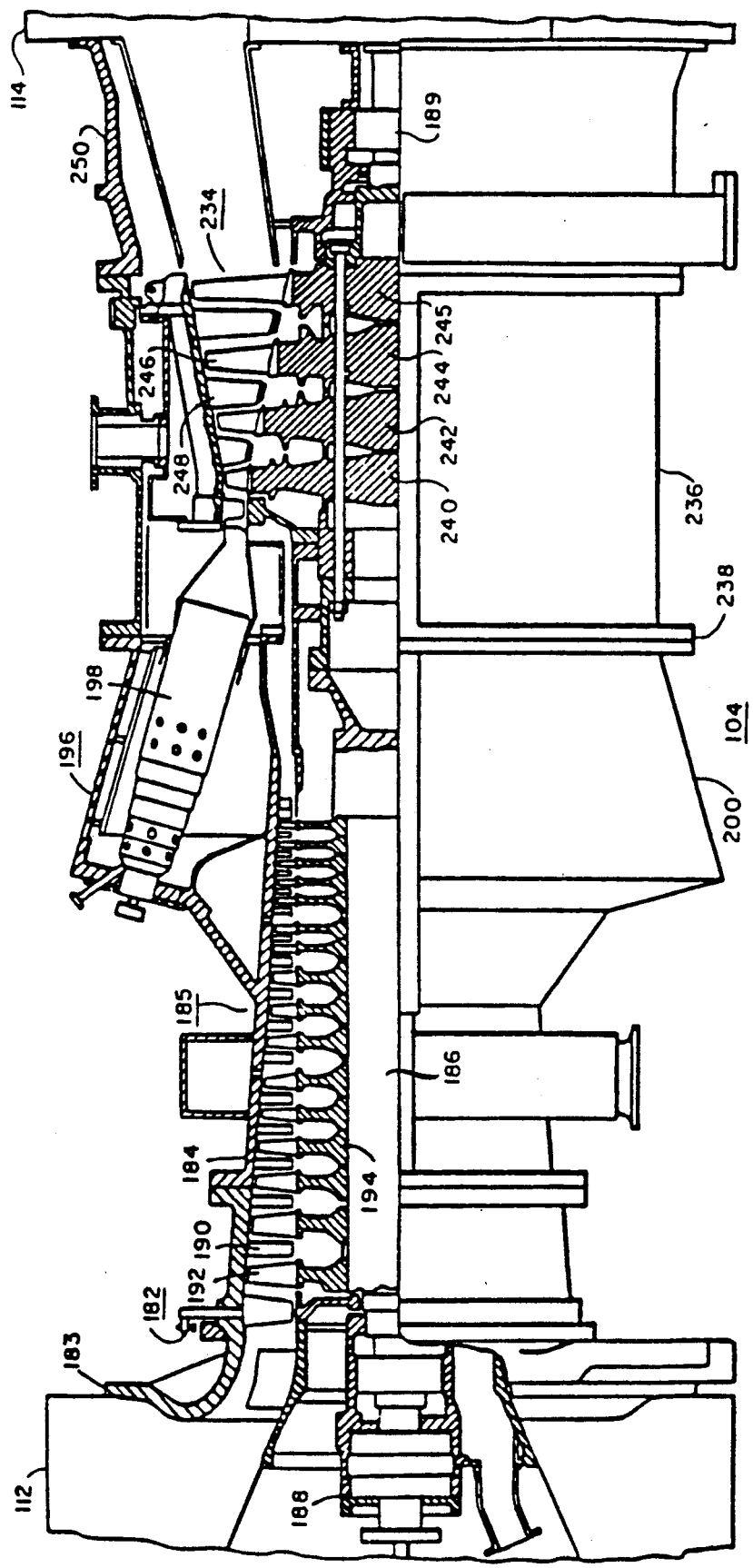
FIG. 5 shows a front elevational view of an industrial gas turbine employed in the power plant of FIG. 1.

Referring now to FIG. 5, gas turbine 104 in the preferred embodiment is the W 501D5, a simple cycle type having a rated speed of 3600 rpm. As will be apparent from the drawings, turbine 104 includes a two bearing single shaft construction, cold-end power drive and axial exhaust. Filtered inlet air enters multistage axial flow compressor 185 through flanged inlet manifold 183 from inlet duct work 112. An inlet guide vane assembly 182 includes vanes supported across the compressor inlet to provide for surge prevention particularly during start up. The angle at which all of the guide vanes are disposed in relation to the gas stream is uniform and controlled by a computer generated control signal (FIGS. 11 and 12) provided to a pneumatically operated positioning ring (not shown) coupled to the vanes in the inlet guide vane assembly 182.

The compressor 185 is provided with a casing 184 which supports a turbine rotating element, i.e. turbine shaft, through bearings 188 and 189. Vibration transducers (FIG. 11) similar to those described in connection with FIG. 4 are provided for the gas turbine bearings 188 and 189. Compressor rotor structure 186 is secured to the turbine shaft in any known manner. The compressor casing 184 also supports stationary blades 190 in successive stationary blade rows along the air flow path.

The compressor inlet air flows annularly through stages in compressor 185. Blades 192 mounted on the rotor 186 by means of discs 194 are appropriately designed from an aerodynamic and structural standpoint for the intended service. Both the compressor inlet and outlet air temperatures are measured by suitably supported thermocouples (FIG. 11).

Consider now the combustion system. Pressurized compressor outlet air is directed into a combustion system 196 comprising a total of sixteen can-annular combustors 198 conically mounted within a section 200 of the casing 184 about the longitudinal axis of the gas turbine 104. Combustor shell pressure is detected by a suitable sensor (FIG. 11) coupled to the compressor-combustor flow paths and provides a signal to cabinet 118 and pressure switch and gauge cabinet 152.

Combustors 198 are shown to be cross-connected by cross-flame tubes 202 for ignition purposes in FIG. 6 (only fourteen are shown). A computer enabled sequenced ignition system 204 includes ignitors 206 and 208. The computer generated enabling signal will be described later. Generally, ignition system 204 includes a capacitance discharge ignitor and wiring to respective spark plugs which form a part of the ignitors 206 and 208. The spark plugs are mounted on retractable pistons within the ignitors 206 and 208 so that the plugs can be withdrawn from the combustion zone after ignition has been executed. The current of the signal applied to the spark plugs is measured by any suitable device and provided as feedback to the central processor (FIG. 11).

A pair of ultraviolet (UV) flame detectors 212 and 214 are associated with each of two combustors in order to verify ignition and continued presence of combustion in the fourteen combustor baskets 198. Redundancy in flame sensing capability is especially desirable because of the hot flame detector environment.

In FIG. 7, dual fuel nozzle 216 is mounted at the compressor end of each combustor 198. An oil nozzle 218 is located at the center of the dual nozzle 216 and an atomizing air nozzle 220 is located circumferentially thereabout. An outer gas nozzle 222 is disposed about the atomizing air nozzle 220 to complete the assembly of the fuel nozzle 216.

As indicated in the section view of FIG. 8, fuel oil or other liquid fuel enters the oil nozzle 218 through conduit 224 while atomizing air enters manifold 226 through bore 228. Gaseous fuel is emitted through the nozzle 222 after flow through entry pipe 230 and manifolded/multiple nozzle arrangement 232. The regulation of fuel flow through conduits 224 and 230 will be described later.

A portion of the compressor outlet air flow combines with the fuel in each combustor 198 to produce combustion after ignition and the balance of the compressor outlet air flow combines with the combustion products for flow through combustors 198 into a multistage reaction type turbine 234 (FIG. 5). The combustor casing section 200 is coupled to a turbine casing 236 through a vertical casing joint 238. No high pressure air or oil seal is required between the compressor 185 and the turbine 234.

The turbine rotor is formed by four disc blade assemblies 240, 242, 244 and 245 mounted on a stub shaft by through bolts. Temperature sensing thermocouples (FIG. 11) are supported within the disc cavities to provide cavity temperature signals for the control system. High temperature alloy rotor blades 246 are mounted on the discs in forming the rotor assembly.

The two support bearings 188 and 189 for turbine rotating structure are preferably so-called tilting pad bearings.

In addition to acting as a pressure containment vessel for the turbine 234, the turbine casing 236 supports stationary blades 248 which form stationary blade rows interspersed with the rotor blade rows. Gas flow is discharged from the turbine 234 substantially at atmospheric pressure through a flanged exhaust manifold 250 attached to the outlet duct work 114.

A number of thermocouples are associated with the gas turbine bearing metal. Further, thermocouples for the blade flow path are supported about the inner periphery of the exhaust manifold 250 in any known manner to provide a fast response indication of blade temperature for control system usage particularly during plant start up periods. Exhaust temperature detectors are disposed in the exhaust duct work 114 primarily for the purpose of determining average exhaust temperature for system usage during load operations of the power plant 100. The significance of the above described thermocouples and other temperature detectors will be described in relation to FIG. 11.

Consider now the fuel system of turbine 104. Referring to FIG. 9, a fuel system 251 is provided for the delivery of gaseous fuel to the gas nozzles 222 under controlled fuel valve operation. Gas is transmitted to a diaphragm operated pressure regulating valve 254 from a gas source. It is noted at this point in the description that IEEE switch gear device numbers are generally used herein where appropriate as incorporated in American Standard C37.2-1956.

A starting valve 256 determines gas fuel flow to the nozzles 222 at turbine speeds up to 3600 RPM. Valve 256 is pneumatically positioned by pneumatic actuator 261 in response to a computer generated control signal. For ignition, valve 256 is partially open when pneumatic actuator 261 is in its fully closed position. Pressure regulating valve 257 provides a constant pressure and thus at ignition a constant gas flow for repeatable gas ignition in the combustion baskets.

As the maximum flow range of the valves 257 and 256 is reached, valve 258 opens to control gas flow to the combustion turbines maximum load output.

A pneumatically operated trip valve 260 stops gas fuel flow under mechanical actuation if turbine overspeed reaches a predetermined level such as 110% rated speed. A pneumatically operated vent valve 262 allows trapped gas to be vented to the atmosphere from trip valve 260 as does on/off pneumatically operated isolation valve 264. Valves 260 and 262 are normally both open and valve 264 is normally closed. The isolation valve fuel control action is initiated by an electronic control signal applied through the pressure switch and gauge cabinet 152 (FIG. 1 and FIG. 11). Sensor 261 Detects gas flow and generates a signal representative of such flow for use by processor 344.

Referring now to FIG. 10, a liquid fuel supply system 266 provides for liquid fuel flow to nozzles 218 (only eight are shown) from any suitable fuel source by means of the pumping action of motor driven main fuel pump 268. Pump discharge pressure is sensed for control system use by a detector 267. A bypass valve 271 is pneumatically operated by an electropneumatic converter 270 and a booster relay 273 to determine liquid fuel bypass flow to a return line and thereby regulate liquid fuel discharge pressure. A computer generated control signal provides for pump discharge pressure control, and in particular it provides for ramp pump discharge pressure control during turbine start up. A throttle valve 272 is held at a minimum position during the ramp pressure control action on the discharge pressure regulator valve 270. A pressure switch 275 indicates whether the pump 268 has pressurized intake flow.

After pressure ramping, the pneumatically operated throttle valve 272 is positioned to control liquid fuel flow to the nozzles 218 as determined by a pneumatic actuator 274 and a booster relay 276. A computer generated control signal determines the converter position control action for the throttle valve 272. During such operation, bypass valve 270 continues to operate to hold fuel discharge pressure constant.

As in the gas fuel system 251, a mechanically actuated and pneumatically operated overspeed trip valve 278 stops liquid fuel flow in the event of turbine overspeed. As in the gas fuel system 251, an electrically actuated and pneumatically operated isolation valve 282 provides on/off control of liquid fuel flow to a liquid manifold 283.

Positive displacement pumps 284 (only eight are shown) are respectively disposed in the individual liquid fuel flow paths to nozzles 218. Pumps 284 are mounted on a single shaft and they are driven by the oil flow from the manifold 283 to produce substantially equal nozzle fuel flows. Check valves 286 prevent back flow from the nozzles 218. Speed sensor 280 senses the speed of pumps 284 which is proportional to fuel flow.

Consider now the control system utilized in controlling plant 100. Power plant 100 is operated under the control of an integrated turbine-generator computer based control system 300 which is schematically illustrated in FIG. 11. The plant control system 300 embraces elements disposed in the control cabinet 118, the pressure switch and gauge cabinet 152 and other elements included in the electric power plant 100 of FIG. 1.

In order to start plant 100, control system 300 first requires certain status information generated by operator switches, temperature measurements, pressure switches and other sensor devices. Once it is determined that the overall plant status is satisfactory, the plant start up is initiated under programmed computer control.

The starting sequence generally embraces starting and operating the starting motor to accelerate the gas turbine 104 from low speed, stopping the turning gear, igniting the fuel in the combustion system at about 20% rated speed, accelerating the gas turbine to about 60% rated speed and stopping the starting meter, accelerating the gas turbine 104 to synchronous speed, and loading the power after generator breaker 136 closure. During shutdown, fuel flow is stopped and the gas turbine 104 undergoes a deceleration coast down. The turning gear is started to drive the turbine rotating element during the cooling off period.

Figure 12:
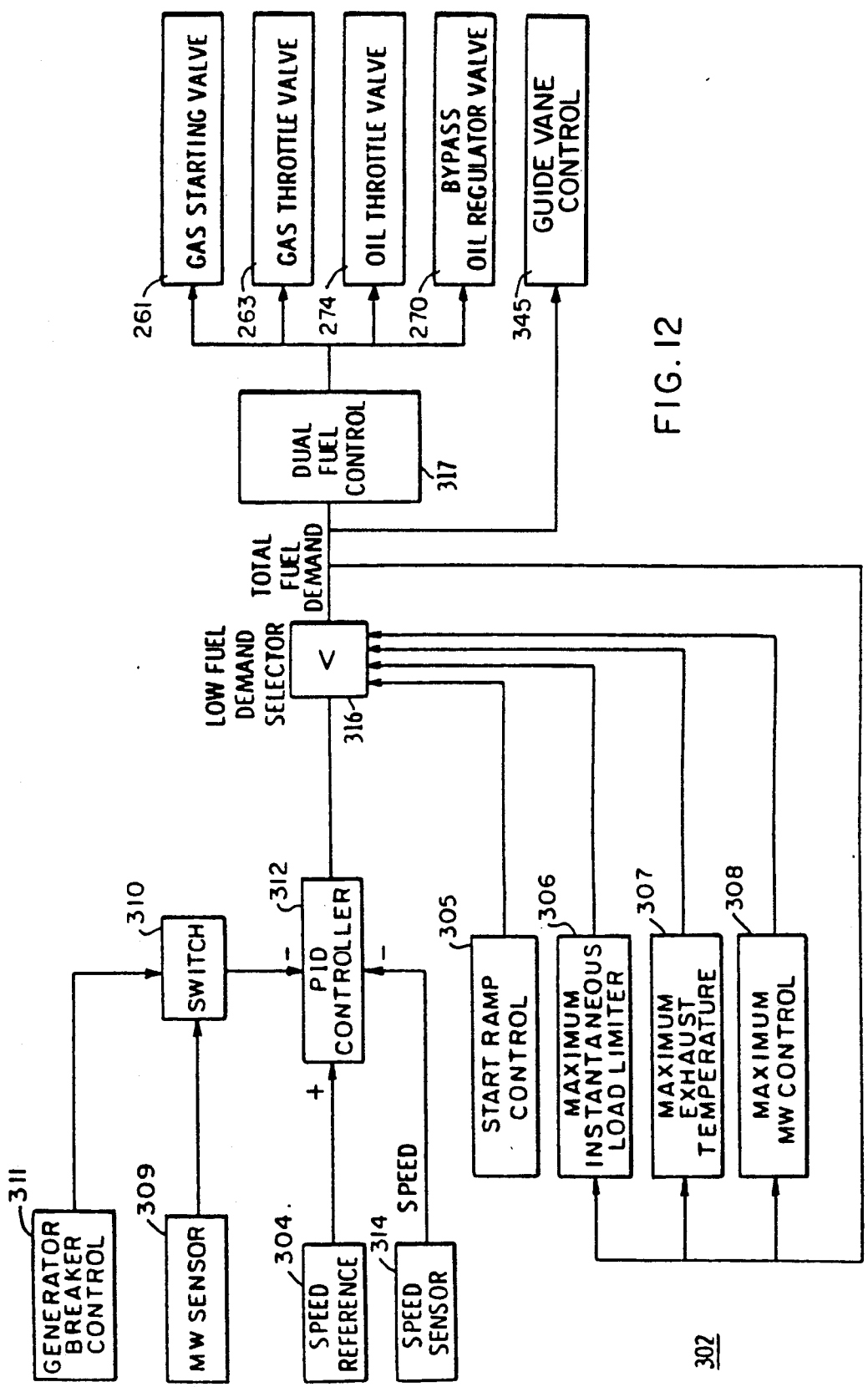
FIG. 12 shows a schematic diagram of a control loop which may be employed in operating the computer control system of FIG. 11.

A control loop arrangement 302 shown in FIG. 12 provides a representation of the preferred general control looping embodied in control system 300 (FIG. 11). Generally, a feed-forward characterization is preferably used to determine a representation of fuel demand needed to satisfy speed requirements. Measured process variables including turbine speed, ambient temperature and pressure, the controlled load variable or the plant megawatts, combustor shell pressure and turbine exhaust temperature are employed to limit, calibrate or control the fuel demand so that apparatus design limits are not exceeded.

The fuel demand in the control arrangement 302 provides position control for turbine gas or liquid fuel valves, 256, 258 and 272. In the combination of plural control loop functions shown in FIG. 12, a low fuel demand selector 316 is employed to limit fuel demand by selecting from various fuel limit representations generated by each control loop. These limit representations are generated respectively by speed control 303, start ramp control 305, maximum exhaust temperature control 306, maximum megawatt control 307 and maximum instantaneous load pickup limiter 308.

Turbine speed is controlled during normal operation by proportional, integral, differential (PID) controller 312. A megawatt feedback signal representative of the megawatt output of generator 102 is generated at 309 by any known technique and is provided to switch 310. Switch 310 provides the megawatt feedback signal to a negative input of controller 312 whenever generator breaker control 311 indicates that the generator breaker has been closed. A signal representative of turbine speed is generated by speed sensor 314, by any known technique, and is provided to another negative input of controller 312. The speed reference signal is provided to the positive input of controller 312.

Since controller 312 will require its inputs to sum zero and since the speed signal from sensor 314 is essentially constant after synchronization, the speed reference signal will be balanced by the megawatt signal such that the output of controller 312 will be representative of a ramping of the speed reference signal to pick up load.

At the output of the low fuel demand selector 316, the fuel demand representation is applied to a dual fuel control 317 where the fuel demand signal is processed to produce a gas fuel demand signal for application to the gas starting and throttle valves or a liquid fuel demand signal for application to the oil throttle and pressure bypass valve or as a combination of gas and liquid fuel demand signals for application to the gas and oil valves together.

Consider now the control system 300 shown in block diagram detail in FIG. 11. It includes a general purpose computer system comprising a central processor 334 and associated input/output interfacing equipment. More specifically, the interfacing equipment for the computer 334 includes a contact closure input system 326 which scans contact or other similar signals representing the status of various plant and equipment conditions.

Input interfacing is also provided for the computer 334 by a conventional analog input system 328 which samples analog signals from the gas turbine power plant 100 at a predetermined rate for each analog channel input and converts the signal samples to digital values for computer processing. A conventional printer 330 is also included and it is used for purposes including for example logging printouts as indicated by the reference character 332.

Output interfacing generally is provided for the computer by means of a conventional contact closure output system 342 and a digital to analog system 344. Analog outputs and the contact closure output system 342 are under program control.

The plant battery 135 considered previously in connection with FIG. 1 is also illustrated since it provides necessary supply voltages for operating the computer system, control system and other elements in the power plant 100. Battery charging is provided by a suitable charger 320.

Connections are made to the contact closure input system 326 from various turbine, protective relay, switch gear, pressure switch and gauge cabinet, and starting motor contacts. In addition certain customer selected contacts 327D and miscellaneous contacts 327C such as those in the motor control center 134 are coupled to the contact closure input system 326.

Analog/digital (A/D) input system 328 has applied to it the outputs from various plant process sensors or detectors, many of which have already been briefly considered. Various analog signals are generated by sensors associated with the gas turbine 104 for input to the computer system 334 where they are processed for various purposes. The turbine sensors 329 A-K include multiple blade path thermocouples, disc cavity thermocouples, exhaust manifold thermocouples, bearing thermocouples, compressor inlet and discharge thermocouples, and, as designated by the block marked miscellaneous sensors 329K, oil reservoir thermocouple, bearing oil thermocouple, a main fuel inlet thermocouple, ambient air temperature sensor and an ambient air pressure sensor.

The sensor used to measure ambient temperature can be any known device such as a thermocouple. Ambient air temperature and ambient air pressure are preferably measured at the compressor inlet.

Combustor shell pressure sensors and turbine speed sensors also have their output signals coupled to the analog input system 328. A turbine support metal thermocouple is included in the miscellaneous block 329K.

Sensors 329 L-R associated with the generator 102 and the plant switch gear are also coupled to the computer 334. The generator temperature sensors include stator resistance temperature detectors (RTD's), inlet cooling RTD's and outlet cooling RTD's, and bearing metal thermocouples. Vibration sensors associated with the generator 102 and the gas turbine 104 are coupled with the analog input system 328 through the operator's console 120 where the rotating equipment vibration can be monitored. As indicated by FIG. 11, additional sensors which are located in the protective relay cabinet generate signals representative of various bus, line, generator and exciter electrical conditions.

Other devices operated by contact closure outputs include the generator field breaker and the generator and line breakers 136, 138 and 139. The motor operated generator exciter field rheostats 171 and 177 and various devices in the motor control center 134 and the pressure switch and gauge cabinet 152 also function in response to contact closure outputs. The printer 330 is operated directly in a special input/output channel to central processor 334.

Figure 13:
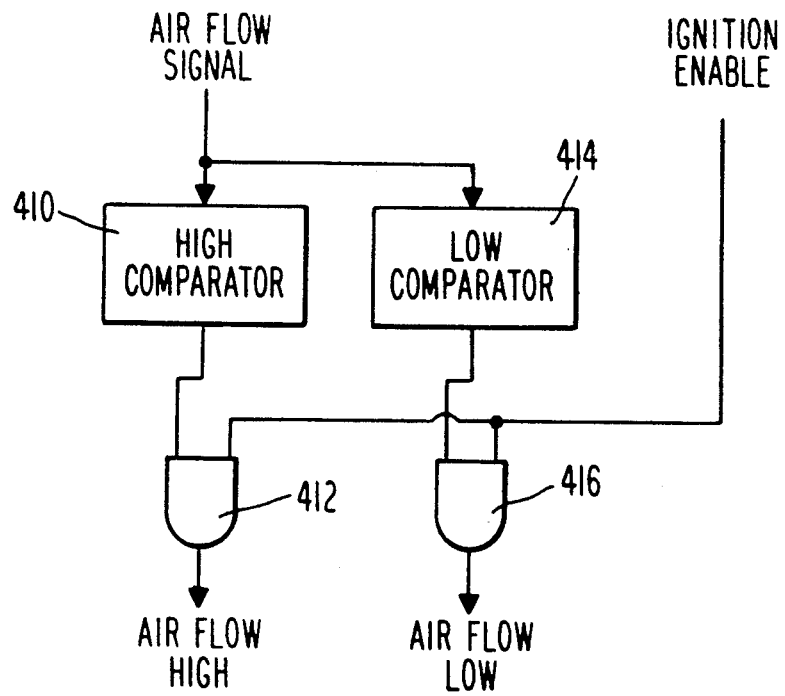
FIG. 13 shows a schematic diagram of an air flow diagnosis device in accordance with the present invention.

The method and apparatus for diagnosing ignition failure conditions of the combustion turbine is more particularly shown in FIGS. 13-19. It will be recalled that several conditions are sensed in the combustion turbine and signals representative of such conditions are forwarded through A/D input system 328 and contact closure input system 326 to central processor 334. For purposes of FIG. 13, it is presumed that an airflow signal representative of the air flow through the turbine is present, such air flow having been sensed in relation to the miscellaneous sensors indicated at 329$k$ (FIG. 11). It is further presumed that an ignition enable system has been provided by central processor 334 which invariably is presented by the contact closure system 342 to starting meter and control 204. As shown in FIG. 13, a first comparator 410 receives that air flow signal and compares that signal to a predetermined high limit. If the air flow signal exceeds the high limit an indication of such comparison is presented to AND gate 412 as a logic high signal.

The air flow signal is also presented to comparator 414 for comparison to a low air flow limit. If the air flow signal is less than the low flow limit, an indication of such comparison is presented to AND gate 416 as a logic high signal. The ignition enabling signal is also shown as being presented to AND the gates 412 and 416. Consequently, if the ignition enabling signal has been received AND gate 412 will output a signal from comparator 410 if it is determined that the air flow has exceeded the high air flow limit or AND gate 416 will output the indication from comparator 414 indicating that the air flow signal is less than the low air flow limit. If ignition of the combustion turbine should fail, either one of this indication signals will readily permit a user to diagnose an air flow problem.

It will be apparent from a review of FIG. 13, that AND gates 412 and 416 collectively constitute a logic member which outputs comparator indication signals when the ignition enable signal has been received.

Figure 14:
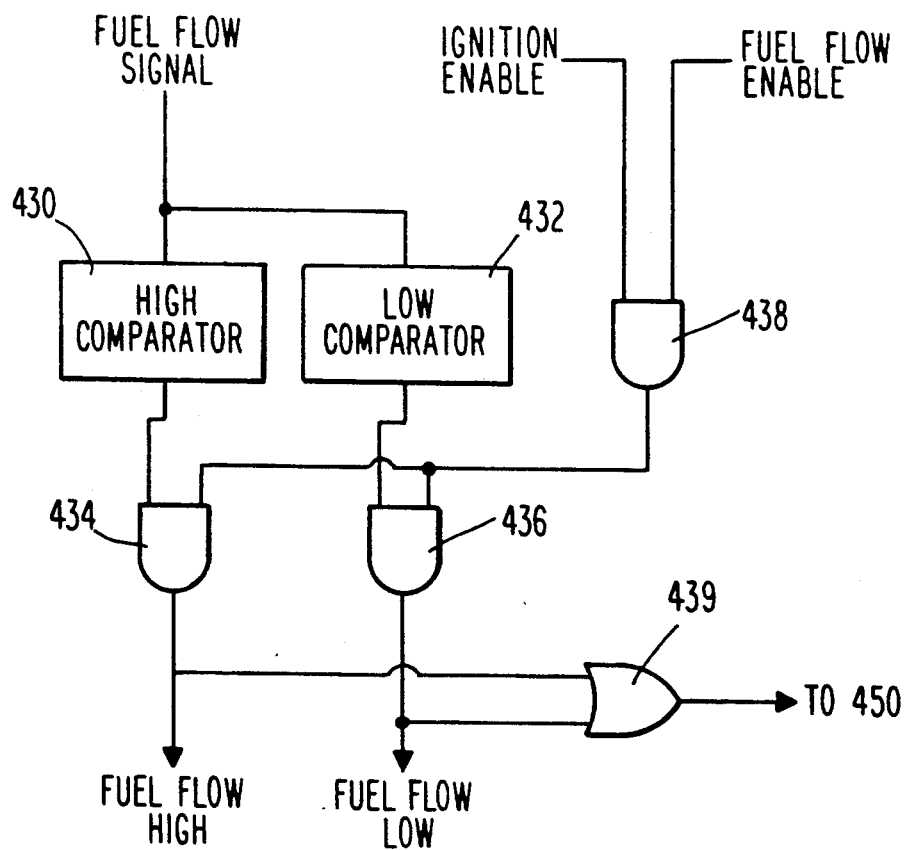
FIG. 14 shows a schematic diagram of a fuel flow diagnosis device in accordance with the present invention.

Referring now to FIG. 14, there is shown device for diagnosing an ignition failure condition, wherein fuel flow is monitored. It will be recalled that sensor 261 (FIG. 9), which is included within the group labeled miscellaneous sensors 329$k$ (FIG. 11), generates a fuel flow signal representative of the fuel flow in the turbine. As shown in FIG. 14, this fuel flow signal is presented to comparator 430 which compares the fuel flow to a high limit and generates an indication signal if the fuel flow exceeds such limit. Concurrently, the fuel flow signal is presented to comparator 432 which compares the fuel flow signal to a low limit and generates an indication signal if the fuel flow is less than such limit.

The signals generated by comparators 430 and 432 are provided to AND gates 434 and 436, respectively. The ignition enable signal (block 402 in FIG. 11) and the fuel enable signal (block 305 in FIG. 12) are each provided to AND gate 438. The output of AND gate 438 is provided as an input to both AND gates 434 and 436. As will be appreciated, an output from AND gate 434 is indicative that fuel flow is too high while an output from AND gate 436 is an indication that fuel flow is too low. It will also be appreciated that the fuel flow monitoring works equally well for either the gas fuel system disclosed in FIG. 9 or for the oil fuel system disclosed in FIG. 10.

Figure 15:
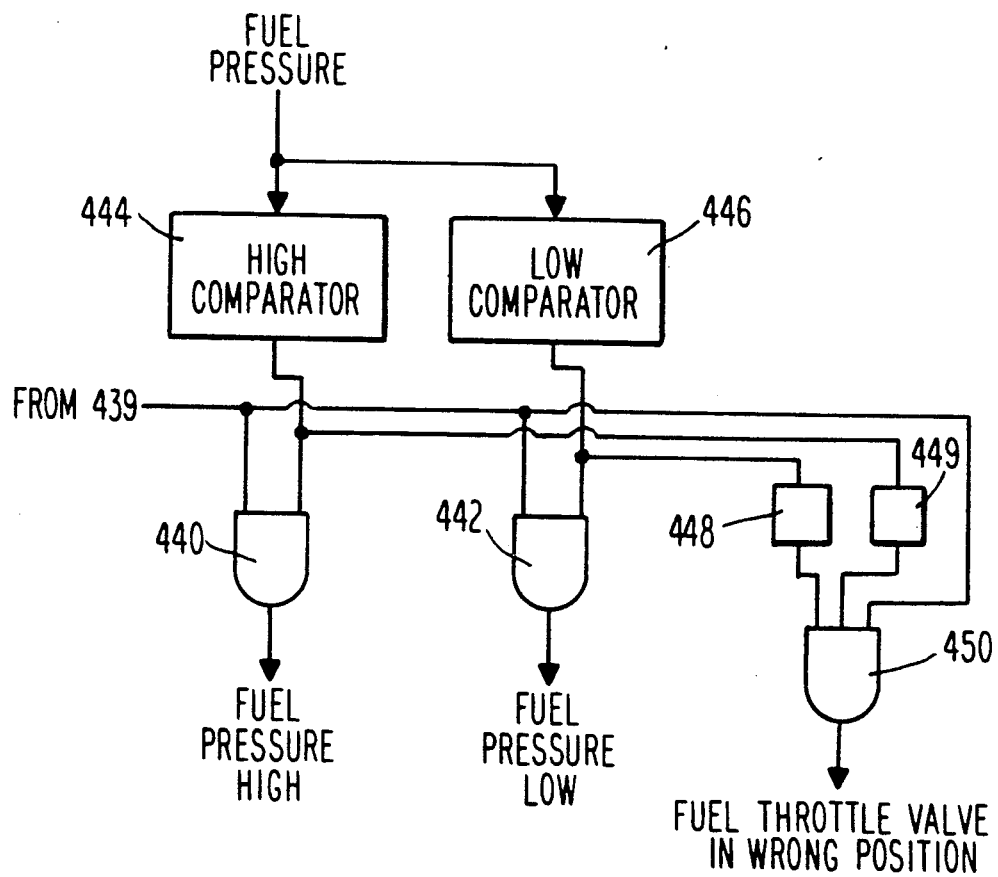
FIG. 15 shows a schematic diagram of a fuel pressure diagnosis device in accordance with the present invention.

By combining the outputs of AND gates 434 and 436 together with fuel pressure information, the improper position of the fuel throttle valve can also be diagnosed. To this end, the outputs of AND gates 434 and 436 are each applied as inputs to OR gate 439, and as shown in FIG. 14, the output of OR gate 439 is applied to AND gates 440 and 442 as shown in FIG. 15. Comparator 444 is connected to the other input of AND gate 440. Comparator 444 is provided with the fuel pressure signal which is representative of the fuel pressure upstream from the throttle valve. Shown in FIG. 10, this signal is generated by pressure sensor 267. Comparator 444 compares the fuel pressure signal to the high limit and generates an indication or a logic high output whenever the fuel pressure signal exceeds this high limit. The fuel pressure signal is also provided to comparator 446 Comparator 446 compares the fuel pressure signal to a low limit and generates an indication signal or logic high output whenever the fuel pressure signal is less than the lower limit. The output of comparator 446 is applied to the other input of AND gate 442. Thus it can be seen that the output of AND gate 440 is an indication that fuel pressure is too high while an output from AND gate 442 is indicative from the fuel pressure being too low. The output of comparators 444 and 446 are also applied as inverted inputs to AND gate 450. The output from OR gate 439 in FIG. 14 is provided to the other input of AND gate 450. A logic high output from AND gate 450 is an indication that a fuel valve is in the wrong position. It will appreciated that AND gate 450 will generate logic high signal when it receives a logic high signal from OR gate 439 and NOT gates 448 and 449.

Figure 16:
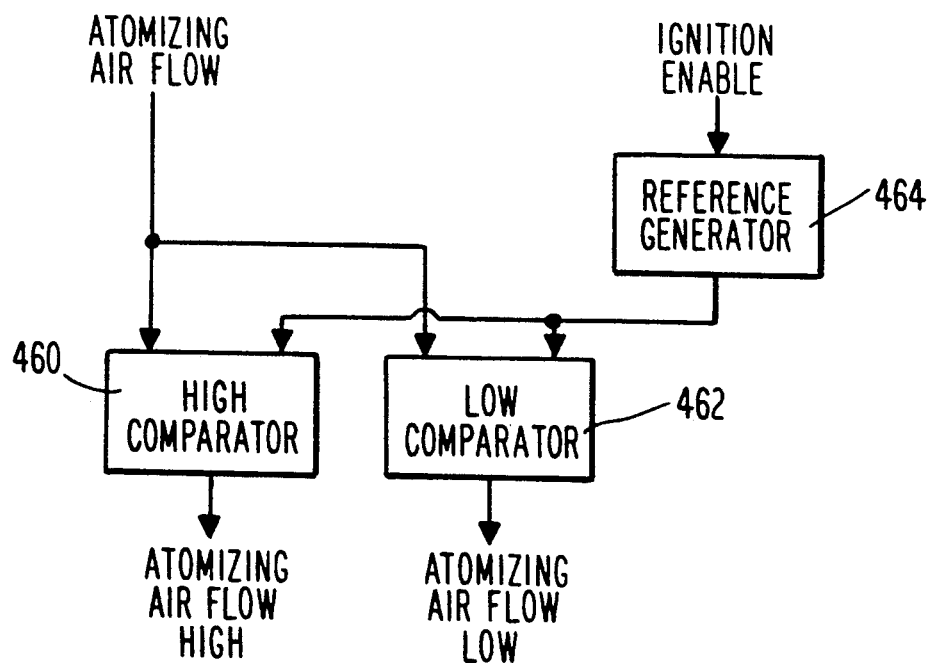
FIG. 16 shows a schematic diagram of an atomizing air flow diagnosis device in accordance with the present invention.

Referring now to FIG. 16 there is shown an apparatus for diagnosing an ignition failure condition wherein an atomizing air flow signal representative of the flow of atomizing air through the fuel nozzles is provided. In other words, a signal representative of the air flow through bore 228 (FIG. 8). Such an air flow sensor is included within the miscellaneous sensors noted at 329k in FIG. 11. The atomizing air flow signal is provided to comparators 460 and 462 in FIG. 16. These comparators are dynamic comparators in that the reference signal to which the atomizing air flow signal is compared changes with time. To this end, the atomizing air enable signal is provided to a reference signal generator 464. Signal generator 464 generates an atomizing air flow reference signal which is representative of a desired flow of atomizing air of a turbine time, i.e., at particular points in time during a turbine operating cycle. The output of signal generator 464 is provided as the reference input to comparators 460 and 462. Comparator 460 compares the actual atomization air flow signal to the reference signal and generates an output if the actual air flow signal exceeds the reference signal. Comparator 462 generates an output if the actual atomizing air flow signal is less than the reference signal. In one embodiment of the present invention, signal generator 464 includes a memory having atomizing air flow information stored therein. Upon receipt of the ignition enable signal, signal generator 464 retrieves information stored in memory and outputs such information in a time sequence flow.

Figure 17:
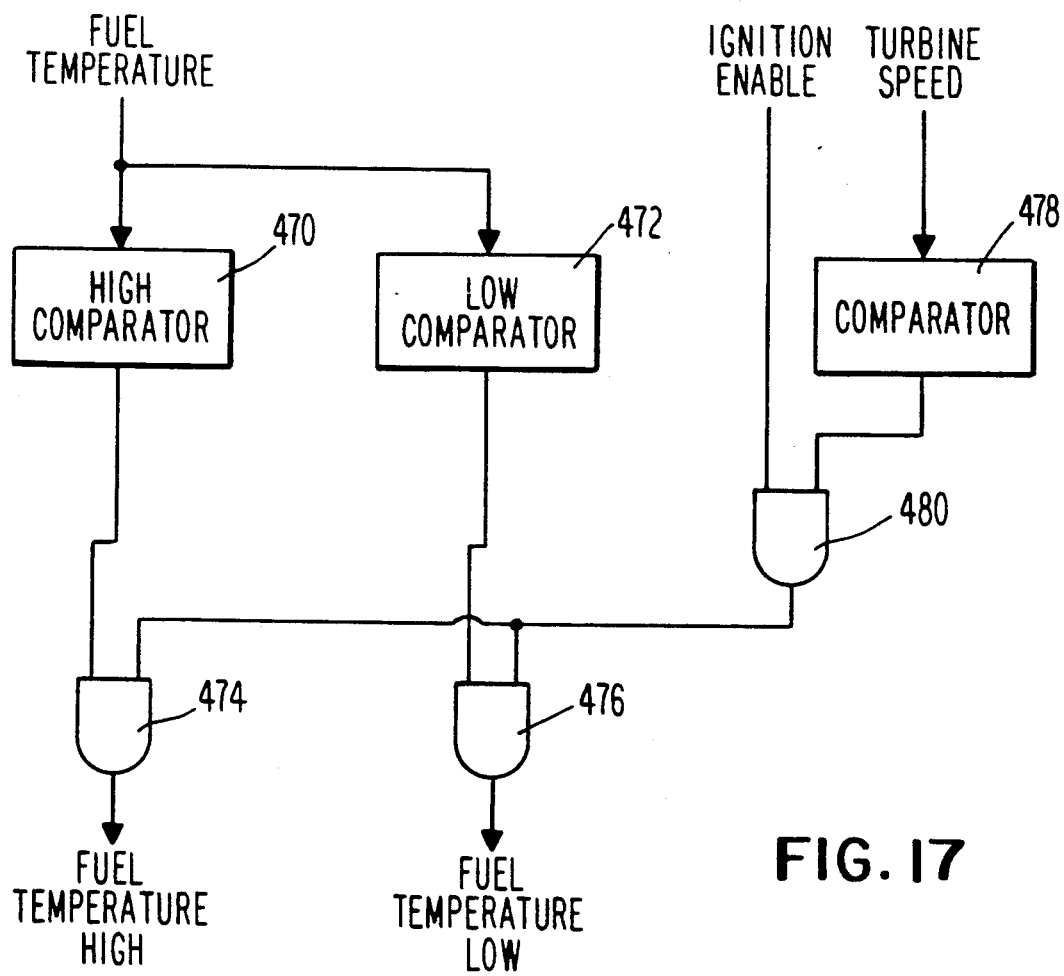
FIG. 17 shows a schematic diagram of a fuel oil temperature diagnosis device in accordance with the present invention.

Referring now to FIG. 17, there is shown a device for diagnosing ignition failure wherein a fuel temperature signal is provided. The fuel temperature signal is provided to comparators 470 and 472. Comparator 470 compares the fuel temperature signal to a high limit and generates a logic high output if the fuel temperature is greater than the high limit. Comparator 472 compares the fuel temperature to a lower limit and generates a logic high output if the fuel temperature is less than this lower limit. The signals from comparators 470 and 472 are applied as inputs to the AND gates 474 and 476 respectively. Also shown in FIG. 17, the sensed speed signal, i.e., generated by speed sensor 314, is provided to comparator 478. Comparator 478 determines whether turbine speed is less than a predetermined amount. In the preferred embodiment, such predetermined reference speed is approximately 3,600 rpm. The output of comparator 478 is provided to AND gate 480. The ignition enable signal is also provided to AND gate 480. It will be noted that comparator 478 is necessary so that the fuel temperature is only diagnosed during start-up operation. As will be appreciated from the above, the output of AND gate 474 is an indication that the fuel temperature is too high during the ignition process while the output of AND gate 476 is indicative of the fuel temperature being too low during the ignition process.

Figure 18:
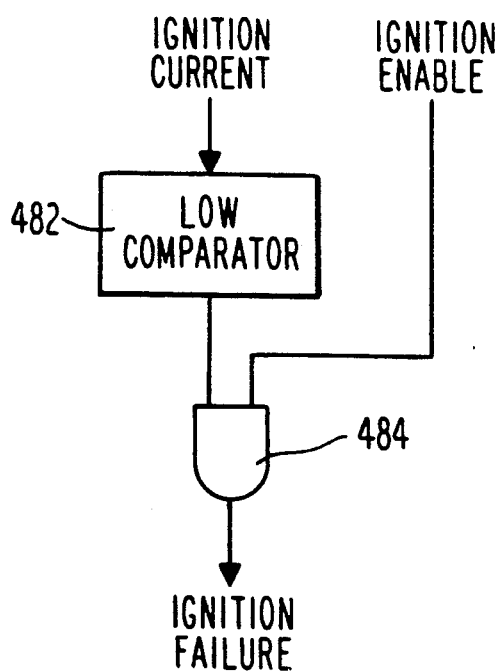
FIG. 18 shows a schematic diagram of an ignitor operation diagnosis device in accordance with the present invention.

Referring now to FIG. 18, there is shown a device for diagnosing ignition failure in relation to ignitor current. It will be recalled that each ignitor contains spark plugs which serve to ignite the fuel passing through the nozzles. See generally the discussion in relation to FIG. 6. A sensor in ignition system 204 senses the current provided to each spark plug and generates an ignitor signal which is representative of such current. Considering only one ignitor for the moment, the ignitor signal is passed through comparator 482 which compares the current signal to a low limit. If the current signal is less than the low limit a logic high output signal is provided to AND gate 484. The ignition enable signal is also provided to AND gate 484. An output from AND gate 484 is indicative that the current in ignitor 1 is too low. Comparator 482 and AND gate 484 are repeated for each ignitor contained in the turbine.

Figure 19:
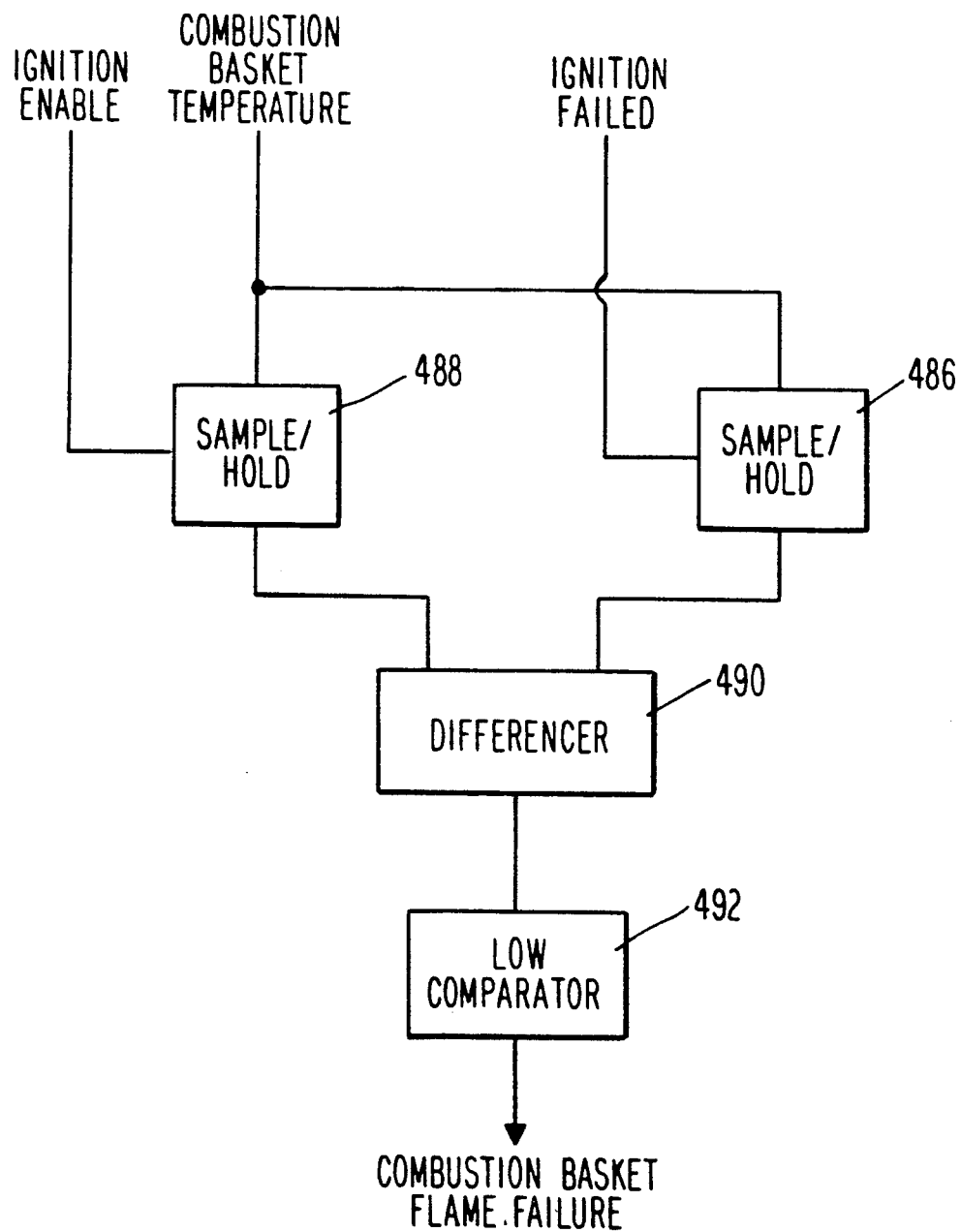
FIG. 19 shows a schematic diagram of a combustor basket operation diagnosis device in accordance with the present invention.

Referring now to FIG. 19, the ignition on signal is provided to the hold input of sample/hold device 488. The failed ignition signal is provided to the hold input of sample/hold device 486. Ignition is attempted for a preset time and if no ignition has occurred, as sensed by flame detectors 212 and 214 shown in FIG. 6, a failed ignition signal is generated. A signal representative of the temperature in the combustion basket is provided to the sample input of each device 486 and 488. The output of sample hold/devices 486 and 488 are provided to difference member 490 which determines the difference between the two outputs. The output of difference member 490 is provided to comparator 492 which compares the difference signal to a low limit. If the difference signal is less than the low limit comparator 492 provides a logic high output, indicative of a combustion basket flame failure. In operation, since the temperature of the combustion basket is being sampled by two sample/hold devices, any difference between the signals is an indication of the ignition failure and possibly flame failure as well. Since spark plugs are only present in two of the combustion baskets out of a variable number depending on the combustion turbine model, ignition is dependent on the flame from these two baskets to propagate around to all baskets. Knowing which basket had flame and which did not is a valuable tool in determining the ignition problem. It will be noted that the device disclosed in FIG. 19 is repeated for each combustion basket contained in turbine 104.

While the invention has been described and illustrated with reference to specific embodiments, those skilled in the art will recognize that modification and variations may be made without departing from the principles of the invention as described herein above and set forth in the following claims.

We claim:

1. An electric power plant, comprising:
   a combustion turbine having a shaft, said combustion turbine being operative to turn said shaft in response to the combustion of fuel in said turbine and said combustion turbine having an ignition system to ignite said fuel in response to an ignition enabling signal;
   a generator connected to said shaft so that electric power is produced when said turbine shaft turns;
   ignition means for generating said ignition enabling signal;
   reference means for generating a plurality of reference signals, wherein each of said signals are representative of a desired operating condition in said combustion turbine;
   sensor means for sensing actual operating conditions in said combustion turbine each of which corresponds to a desired operating condition and for generating a plurality of operating signals representative of said actual operating conditions;
   comparator means for comparing each of said operating signals to a corresponding reference signal and for indicating when each representative operating signal exceeds said corresponding reference signal upon receipt of said ignition enabling signal.

2. The apparatus of claim 1, wherein said sensor means generates a signal representative of the air flow through the turbine and said reference means generates first and second air flow limits, said apparatus further comprising,
   a first comparator for comparing said air flow signal to said first limit and for generating a first indication signal if said air flow signal exceeds said first limit;
   a second comparator for comparing said air flow signal to said second limit and for generating a second indication signal if said air flow signal is less than said second limit; and
   logic means connected to receive said first and second indication signals and said ignition enabling signal, for outputting said indication signals when said ignition enabling signal has been received.

3. The apparatus of claim 2, wherein said logic means comprises first and second AND gates, wherein said first AND gate is connected to receive said first indication signal and said ignition enable signal and said second AND gate is connected to receive said second indication signal and said ignition enable signal.

4. The apparatus of claim 1, wherein said sensor means generates a signal representative of the fuel flow through the turbine and said reference means generates first and second fuel flow limits, said apparatus further comprising,
   a first comparator for comparing said fuel flow signal to said first limit and for generating a first indication signal if said fuel flow signal exceeds said first limit;
   a second comparator for comparing said fuel flow signal to said second limit and for generating a second indication signal if said fuel flow signal is less than said second limit; and
   logic means connected to receive said first and second indication signals and said ignition enabling signal, for outputting said indication signals when said ignition enabling signal has been received.

5. The apparatus of claim 4, wherein said logic means comprises a first AND gate connected to receive said ignition enable signal and said fuel enable signal and second and third AND gates, wherein said second AND gate is connected to receive said first indication signal and the output of said first AND gate and said third AND gate is connected to receive said second indication signal and the output of said first AND gate.

6. The apparatus of claim 4, wherein said combustion turbine comprises a fuel throttle valve and wherein a fuel pressure signal representative of the fuel pressure upstream of said valve is given, further comprising second logic means, connected to receive said first and second indication signals and said fuel pressure signal, for generating a third indication signal when said fuel flow signal exceeds a third limit and either of said first and second indication signals have been received and for generating a fourth indication signal when said fuel flow signal is less than a fourth limit and either of said first and second indication signals have been received.

7. The apparatus of claim 6, wherein said second logic means further generates a fifth indication signal when either said third or fourth indication signals are generated.

8. The apparatus of claim 6, wherein said second logic means comprises:
   a third comparator for comparing said fuel pressure signal to said third limit and for generating a first output signal if said fuel pressure signal exceeds said third limit;
   a first AND gate, connected to receive said first output signal and said first indication signal, for generating said third indication signal upon receipt of said first output and said first indication signals;
   a fourth comparator for comparing said fuel pressure signal to said fourth limit and for generating a second indication signal if said fuel pressure signal is less than said second limit; and
   a second AND gate, connected to receive said first output signal and said first indication signal, for generating said fourth indication signal upon receipt of said first output and said first indication signals.

9. The apparatus of claim 8, wherein said fuel is gas.

10. The apparatus of claim 8, wherein said fuel is oil.

11. The apparatus of claim 1, wherein said sensor means generates a signal representative of atomizing air through fuel nozzles in the turbine,
    said reference means being connected to receive said ignition enable signal, and having means for generating an atomizing reference signal representative of desired flow of atomizing air over turbine operating time, said atomizing reference signal being generated in response to said ignition enable signal;

a first comparator, connected to receive said atomizing air flow signal and said atomizing reference signal, for comparing said atomizing air flow signal to said atomizing reference signal and for generating a first indication signal if said atomizing air flow signal exceeds said atomizing reference signal; and a second comparator, connected to receive said atomizing air flow signal and said atomizing reference signal, for comparing said atomizing air flow signal to said atomizing reference signal and for generating a second indication signal if said atomizing air flow signal is less than atomizing reference signal.

12. The apparatus of claim 11, wherein said reference signal generator comprises a memory having stored therein information representative of the desired atomizing air flow for said turbine, wherein said reference signal is generated by outputting such information from said memory in time sequence upon receipt of said ignition enable signal.

13. The apparatus of claim 1, wherein said sensor means generates a signal representative of fuel temperature, said apparatus further comprising, said reference means generating first, second and third temperature references, a first comparator, connected to receive said fuel temperature signal, for comparing said fuel temperature signal to a first temperature reference and for generating a first indication signal if said fuel temperature signal exceeds said first temperature reference;

a second comparator, connected to receive said fuel temperature signal, for comparing said fuel temperature signal to a second temperature reference and for generating a second indication signal if said fuel temperature signal is less than said second temperature reference;

a third comparator, connected to receive said speed signal, for comparing said speed signal to a speed reference and for generating a third indication signal if said speed signal is less than said speed reference; and logic means connected to receive said first, second and third indication signals and said ignition enabling signal, for outputting said first and second indication signals when said ignition enabling signal and said third indication signal have been received.

14. The apparatus of claim 13, wherein said logic means comprises a first AND gate connected to receive said ignition enable signal and said third indication signal and second and third AND gates, wherein said second AND gate is connected to receive said first indication signal and the output of said first AND gate and said third AND gate is connected to receive said second indication signal and the output of said first AND gate.

15. The apparatus as described in claim 1, wherein fuel is ignited in said combustion turbine by at least one ignitor in response to a control signal, wherein an ignitor signal representative of the current of said control signal is given, said apparatus comprising, a first comparator, connected to receive said ignitor signal, for comparing said ignitor signal to a current reference and for generating an indication signal if said ignitor signal is less than said reference; and first logic means connected to receive said indication signal and said ignition enabling signal, for outputting said indication signal when said ignition enabling signal has been received.

16. The apparatus of claim 15, wherein said turbine comprises a plurality of ignitors, said apparatus comprising a plurality of comparators and logic means, identical to said first comparator and said first logic means, wherein one of said comparators and one of said logic means are associated with each of said ignitors.

17. The apparatus of claim 16, wherein said combustion turbine comprises a plurality of combustion baskets and wherein a basket temperature signal representative of the of the temperature in a combustion basket is given for each of said combustion baskets, said apparatus further comprising:

first and second sample/hold devices, each having a sample input, a hold input and an output, wherein said first sample/hold device is connected to receive said basket temperature signal at said sample input and said ignition enable signal at said hold input and wherein said second sample/hold device is connected to receive said basket temperature signal at said sample input and said indication signal at said hold input;

a difference member, connected to the output of each of said first and second sample/hold devices, for generating a difference signal representative of the difference between the outputs; and a comparator, connected to receive said difference signal, for comparing said difference signal to a difference reference and for generating a second indication signal when said difference signal is less than said difference reference.

* * * * *